United States Patent [19]
Fisher, Jr. et al.

[11] Patent Number: 5,864,183
[45] Date of Patent: Jan. 26, 1999

[54] METHOD AND APPARATUS FOR OPTIMIZING PERFORMANCE OF A PUMP-TURBINE

[75] Inventors: Richard K. Fisher, Jr., Jacobus; Ronald E. Deitz, York, both of Pa.

[73] Assignee: Voith Hydro, Inc., York, Pa.

[21] Appl. No.: 705,894

[22] Filed: Aug. 28, 1996

[51] Int. Cl.⁶ .............................. F03B 13/00; F03B 13/10
[52] U.S. Cl. .............................. 290/43; 290/7; 290/40 A; 290/40 C; 290/53; 290/54; 416/17; 60/364
[58] Field of Search ................. 290/7, 40 A, 40 B, 290/40 C, 43, 54, 53; 364/490, 550, 551, 552; 416/17; 60/364, 398

[56] References Cited

U.S. PATENT DOCUMENTS

| | | | |
|---|---|---|---|
| 4,234,925 | 11/1980 | Kitano et al. | 364/494 |
| 4,319,320 | 3/1982 | Sato et al. | 364/165 |
| 4,408,452 | 10/1983 | Tsunoda | 60/398 |
| 4,467,216 | 8/1984 | Murphy | 290/43 |
| 4,486,381 | 12/1984 | Koji et al. | 376/210 |
| 4,650,633 | 3/1987 | Youngborg | 376/210 |
| 4,674,279 | 6/1987 | Ali et al. | 60/398 |
| 4,683,718 | 8/1987 | Larsson | 60/327 |
| 4,708,594 | 11/1987 | Shinmei et al. | 417/53 |
| 4,770,843 | 9/1988 | Taleyarkhan | 376/216 |
| 4,794,544 | 12/1988 | Albright et al. | 364/494 |
| 4,823,018 | 4/1989 | Kuwabara et al. | 290/6 |
| 4,920,277 | 4/1990 | Kuwabara et al. | 290/40 C |
| 4,994,684 | 2/1991 | Lauw et al. | 290/52 |
| 5,322,412 | 6/1994 | Erlach | 415/1 |
| 5,402,332 | 3/1995 | Kopf | 364/149 |

*Primary Examiner*—Clayton E. Laballe
*Assistant Examiner*—Elvin G. Enad
*Attorney, Agent, or Firm*—Foley & Lardner

[57] ABSTRACT

A technique is disclosed for optimizing performance of a pump-turbine unit while operating normally in the pumping mode by identifying gate positions resulting in optimization of certain parameters of interest. Influences of gate positions on the optimized parameters is determined and used to evaluate the combined effect of the gate position on the parameters. Weighting coefficients may be used to alter the relative importance of each parameter in the gate position ultimately selected. Gate positions are optimized for each location in a multi-dimensional virtual cam matrix as conditions defining the locations are encountered. A parameter error or evaluation routine is provided for evaluating the consistency of monitored parameter values and for identifying trends that may require reconfiguration of the virtual cam matrix or alterations in the optimization routine, such as changes in the weighting of various parameters. The technique may be used to identify gate positions for one parameter of interest, such as pumping efficiency, or a number of parameters simultaneously to improve productivity of the facility and avoid or delay maintenance costs caused by degradation influenced by gate settings.

31 Claims, 8 Drawing Sheets

METHOD AND APPARATUS FOR OPTIMIZING PERFORMANCE OF A PUMP-TURBINE

BACKGROUND OF THE INVENTION

The present invention relates generally to improving performance of a pump-turbine unit. In particular, the invention relates to a technique for optimizing performance of pump-turbines by identifying wicket gate settings optimizing one or more operating parameters such as efficiency during a pumping mode of operation, cavitation, vibration and the like, capable of adversely affecting profitability or long term operation of the unit. The invention also permits optimal gate settings or data from which such settings may be determined to be associated with operating parameters defining the operating condition of the unit in a multi-dimensional virtual cam matrix for subsequent use when similar conditions are encountered.

Pump-turbine power generation techniques have become well established over recent decades as an alternative or complement to conventional turbine power production arrangements. Generally, pump-turbine machines include a set of wicket gates and a runner/impeller which can operate as a Francis-style turbine in one direction of rotation and as a centrifugal pump in an opposite direction. A motor-generator coupled to the pump turbine functions both as a power generator during a turbining mode of operation and as a motor or prime mover for the pump during a pumping mode.

Pump-turbine installations provide energy storage systems by utilizing excess electric capacity on power distribution grids in times of reduced energy demand to pump water, previously used to generate power, back into an upper reservoir. The water is then again used to generate electricity when needed, such as during peak demand periods. Pump-turbine units are presently in use over a wide range of heads and power output levels. The overall efficiency of pump-turbine units depends not only on the ability of the equipment to effectively produce power from water flow from the upper reservoir during the turbining mode of operation, but equally on its ability to efficiently move water back to the upper reservoir during the pumping mode. To maximize the cost effectiveness of the pump-turbine installation, it is therefore necessary to generate power as efficiently as possible during turbining, while utilizing as little power as possible for the needed water displacement during pumping.

Various techniques have been proposed and are currently in use for regulating operation of pump-turbine units during turbining and pumping modes of operation. In the pumping mode of operation, older governors position the wicket gates in a fixed, predetermined position to let water through the pump to the upper reservoir. However, because the pumping efficiency of the unit is influenced by the wicket gate position, the flow rate and the head across the unit, a single wicket gate position will generally not provide optimal efficiency for different flow rate and head conditions.

Other techniques are known that attempt to improve operation of the pump-turbine in similar manners for both phases of operation. For example, it is known to estimate desired wicket gate positional settings from test data generated on a small scale model for the installation. Such model test data may be used to establish a mechanical or computerized ("virtual") cam surface relating head, flow and power in such a way as to identify desired wicket gate settings. Surfaces, real or virtual, of this type are typically referred to as "3D CAMs." In the pumping mode of operation the power parameter represents the power input needed to drive the pump and thereby displace water at particular head and flow rates to the upper reservoir. It is also known to identify certain preferred wicket gate positions for the pumping mode of operation through special test sequences, such as index tests.

While model-based 3D CAM techniques are generally preferable to the fixed wicket gate approach, they fail to account for differences between model test performance and that of actual equipment. Where index testing is used to identify preferred wicket gate positions, such testing typically requires at least temporary interruption of normal service of the facility, and generally does not identify desired settings over a broad range of operating conditions. Moreover, model testing and index testing do not typically account for the impact of other parameters such as cavitation or vibration during pumping. Because modest improvements in performance can result in considerable gains in revenue for the installation, such drawbacks may amount to large real or opportunity costs for the plant.

There is a need, therefore, for an improved method of controlling pump-turbine installations that allows optimal wicket gate positions for pumping mode operation to be determined for actual operating equipment and during normal operation of the facility. In addition, there is a need for techniques of this type that can account for factors other than head, flow and power input in evaluating the desired gate positions.

SUMMARY OF THE INVENTION

The present invention features a novel technique for improving or optimizing pumping mode performance of a pump-turbine designed to respond to the needs identified above. The invention provides a method and apparatus for optimizing or improving performance of a pump-turbine power generating unit operating in pumping mode. Such improvements in performance may comprise improvements in operating efficiency (e.g., reducing energy costs during pumping), reductions in maintenance costs and associated operational down time, or both. The invention is particularly suited for application in a generating unit including a pump-turbine in fluid communication between a headwater reservoir and a tailwater reservoir, a motor-generator coupled to the pump-turbine for generating electrical power as water flows through the pump-turbine from the headwater reservoir to the tailwater reservoir during a turbining mode of operation and for driving the pump-turbine to displace water from the tailwater reservoir to the headwater reservoir during a pumping mode of operation, and a plurality of movable gates for regulating flow through the pumpturbine. In accordance with one aspect of the invention, the method includes the steps of (a) determining influences of gate positions on at least one operating parameter of interest and (b) monitoring levels of a plurality of operating parameters during normal pumping mode operation of the pump-turbine. Based on the influences determined in step (a) and on the monitored levels, a desired gate position is selected to optimize the parameter of interest, and the gates are positioned in the desired gate position. In accordance with a particularly preferred embodiment, a plurality of parameters of interest are considered in determining the desired gate position, and the relative impact of each parameter on the selected gate position may be altered by assigning values to weighting coefficients associated with each parameter.

In accordance with another feature of the invention, a method for improving performance of a pump-turbine unit calls for dividing operating ranges of each of a plurality of operating parameters for the pump-turbine into a plurality of operating range segments to define a virtual cam matrix comprising matrix locations bounded by the operating range segments, the operating parameters including head, flow rate, power input level during pumping operation of the pump-turbine and at least one other operating parameter. The virtual cam matrix is stored in a memory circuit. Optimal gate setting data for at least one of the matrix locations is then determined, and the optimal gate setting data is stored in the memory circuit for reference in positioning the gates when operating parameter levels are detected corresponding to the associated matrix location.

The method of the invention may be adapted to identify the desired gate position based upon an index value determined from several factors capable of affecting overall or long term operation of the unit. Thus, the method may include the steps of moving the gates to a plurality of positions during the pumping mode of operation, and monitoring the operating parameters for each of the plurality of gate positions. Reference levels are then derived from the operating parameters for each of the plurality of gate positions. The reference levels are then combined to determine an index value for each of the plurality of gate positions. The index values for each of the plurality of gate positions are then compared and a desired gate position is selected from the plurality of gate positions based upon the comparison. Each of the reference values, which may represent such factors as pumping efficiency, cavitation and vibration, may be weighted to reflect the relative priority among the values.

The system of the invention preferably includes a plurality of sensors, a memory circuit and a control circuit. Each of the sensors detects an operating parameter of the pump-turbine unit during the pumping mode of operation, and generates a parameter signal representative thereof. The control circuit is coupled to the plurality of sensors, to the memory circuit and to actuators for moving the wicket gates. The control circuit is configured to identify influences of gate positions on the parameter of interest, to monitor the parameter signals, to determine, based on the parameter signals and the influences, a desired gate position, and to command movement of the at least one actuator for placing the gates in the desired gate position.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
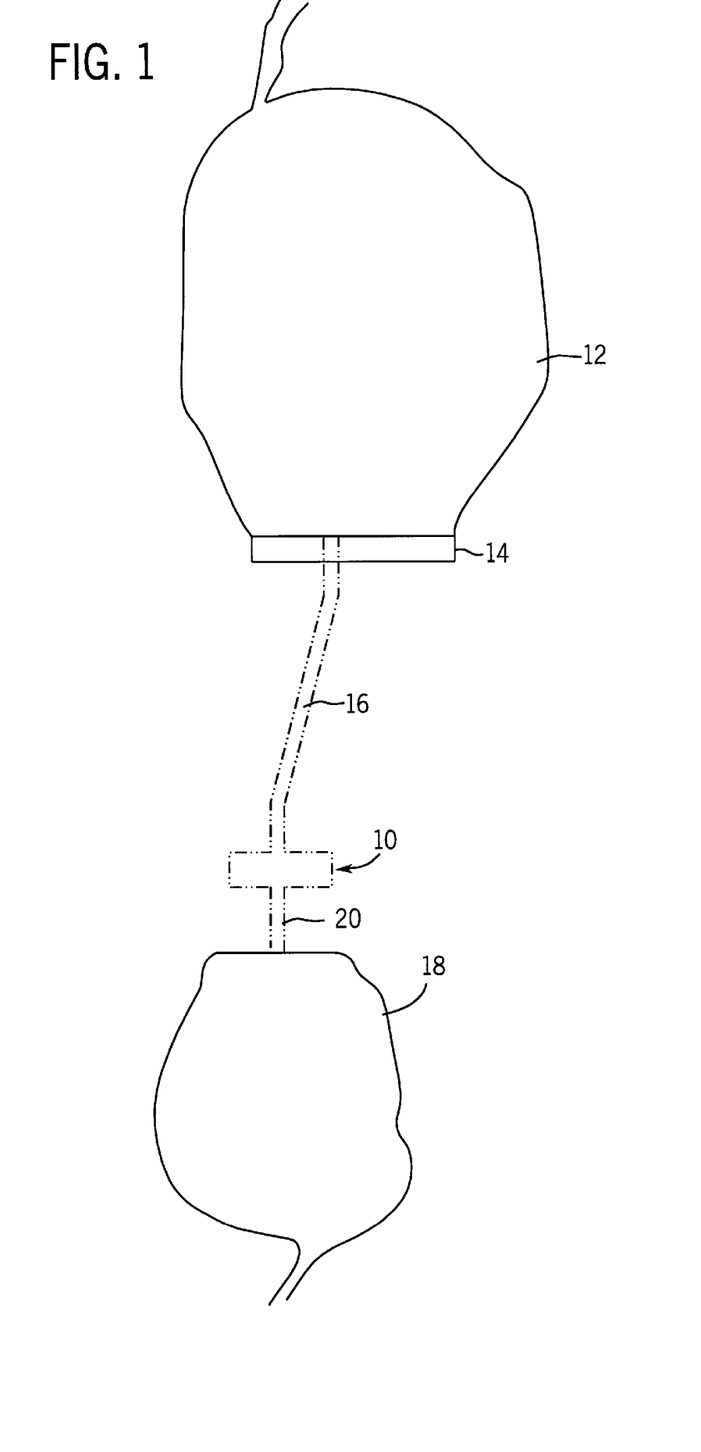
FIG. 1 is an exemplary perspective view of a turbine power generating facility including a pump-turbine unit between upper and lower reservoirs.
Figures 2, 3:
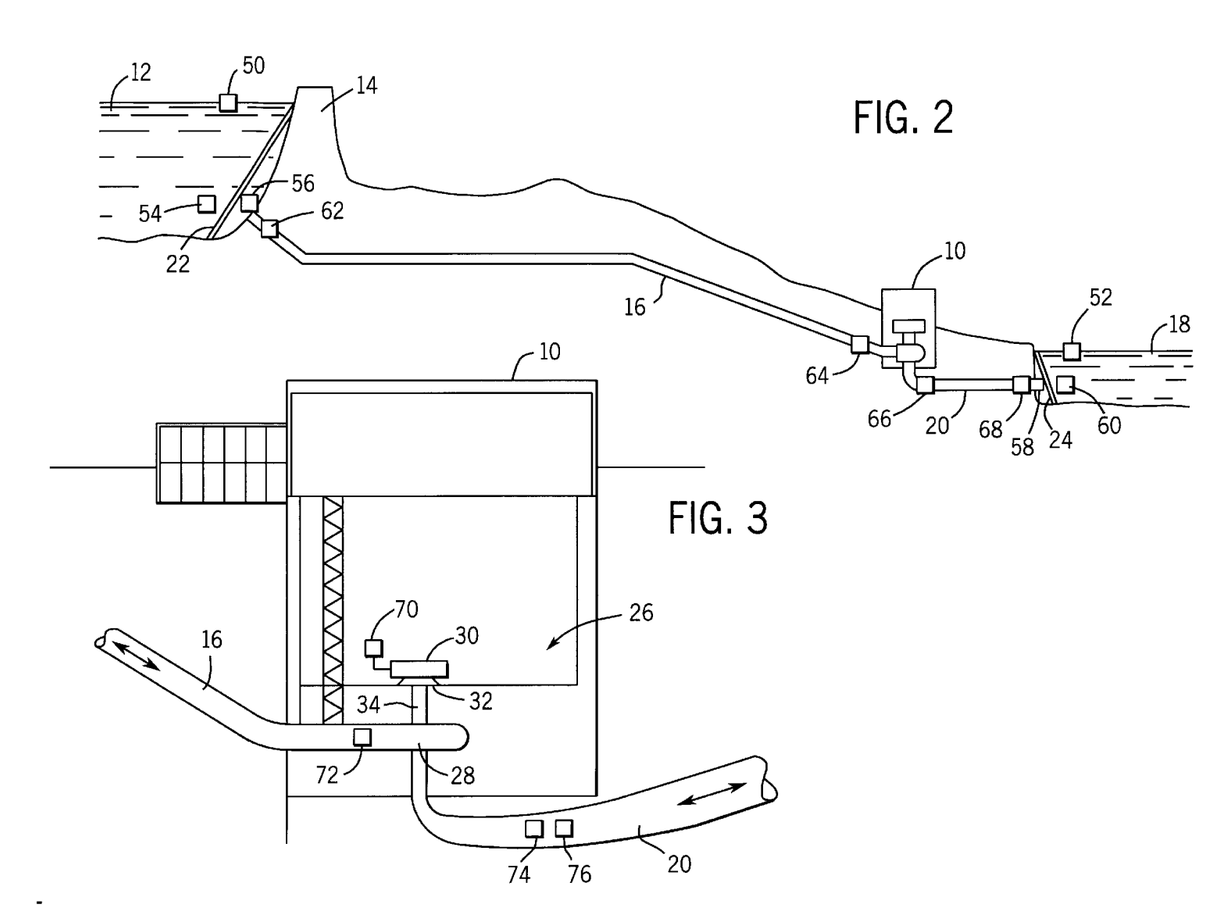
FIG. 2 is a diagrammatical side elevational view of the installation of FIG. 1, illustrating certain of the instrumentation for optimizing performance of the unit during pumping.
FIG. 3 is a diagrammatical elevational view of a portion of the facility illustrating additional instrumentation for optimizing the unit performance.

Turning now to the drawings and referring to FIG. 1, a pump-turbine power generating facility 10 is illustrated in fluid communication with an upper or headwater reservoir 12, partially bounded by an earthworks or dam 14, via an upstream conduit 16. Facility 10 is also in fluid communication with a lower or tailwater reservoir 18 via a downstream fluid conduit 20. As best shown in FIG. 2, in the illustrated embodiment, fluid conduits 16 and 20 are conduits linking upper and lower reservoirs 12 and 18 to facility 10, respectively. A headwater trash rack 22 is provided adjacent to the mouth of conduit 16 in reservoir 12 for preventing large objects from entering conduit 16 and potentially fouling or damaging facility 10. Similarly, a tailwater trash rack 24 is provided at the mouth of conduit 20 in lower reservoir 18. Trash racks 22 and 24 may be of any known type, typically consisting of a series of parallel pipes or bars extending vertically or at an incline between points below and above the mouths of conduits 16 and 20, respectively.

Figure 4:
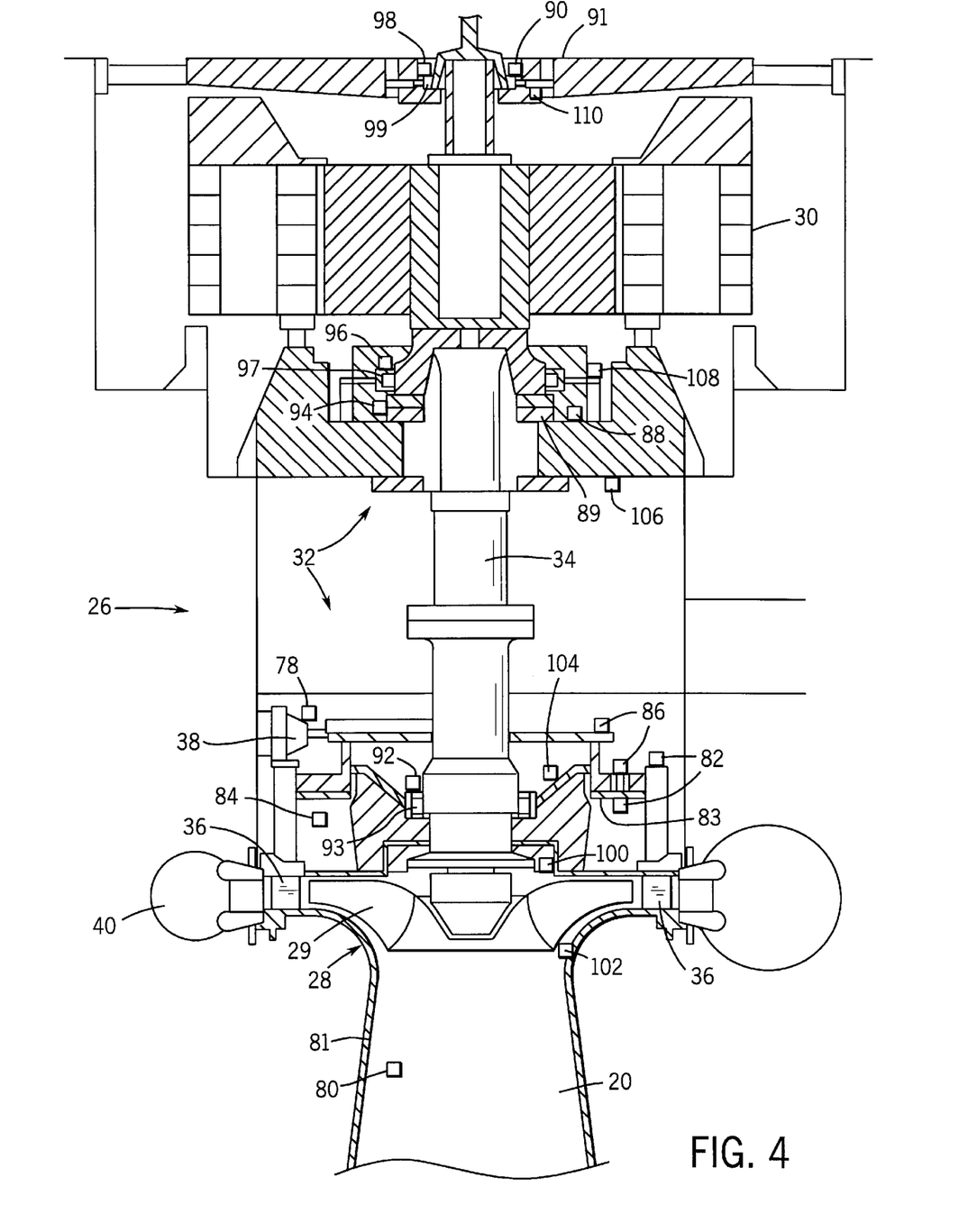
FIG. 4 is a more detailed elevational view of the pump-turbine unit illustrating the additional instrumentation for optimizing the unit performance.

As best shown in FIGS. 3 and 4, facility 10 includes a housing and superstructure for supporting a pump-turbine generating unit, designated generally by the reference numeral 26, and associated equipment, and for allowing servicing of the equipment. In addition, facility 10 includes an operations control center or room (not shown) housing control and communications equipment for monitoring performance of unit 26. Pump-turbine generating unit 26 includes a pump-turbine 28 coupled to a motor-generator 30. Pump-turbine 28 and motor generator 30 are supported by a support structure, designated generally by the reference numeral 32 in FIG. 3, including thrust and guide bearings in a manner generally known in the art. Pump-turbine 28, which includes a rotating impeller 29, is coupled to motor-generator 30 via a drive shaft 34. In operation, impeller 29 of pump-turbine 28 is forced to rotate as water is permitted to flow from upper reservoir 12 to lower reservoir 18 through conduits 16 and 20 during a turbining mode of operation, thereby driving motor-generator 30 to generate electrical power. Electrical power is then output through a power grid (not shown). In a pumping mode of operation, motor-generator 30 drives impeller 29 of pump-turbine 28 to pump water from lower reservoir 18 to upper reservoir 12.

As illustrated in FIG. 4, unit 26 includes a series of movable wicket gates 36 surrounding pump-turbine 28 for regulating flow and efficiency of the unit. Wicket gates 36 are positioned by one or more actuators 38 coupled to hydraulic control valving (not shown) in a conventional manner. During turbining operation of unit 26, water enters pump-turbine 28 through a spiral 40 coupled to conduit 16 and exits through the center of impeller 29. Conversely, during pumping operation, water enters through the center of impeller 29 and exits through spiral 40. Wicket gates 36 are situated between pump-turbine 28 and spiral 40 and are pivoted angularly by movement of actuator 38 to open and close the flow area between pump-turbine 28 and spiral 40.

In accordance with the present technique, a number of operating parameters for unit 26 are sensed during pumping operation and used as the basis for selection of preferred positions of gates 36. Exemplary instrumentation for sensing the various parameters of interest is illustrated in FIGS. 2, 3 and 4. This instrumentation forms part of a control system further including a controller 120, illustrated diagrammatically in FIG. 5, which receives sensed parameter signals from the sensors, and processes the signals to determine the preferred gate positions as described below.

As shown in FIG. 2, preferred instrumentation for optimizing pumping operation of unit 26 includes a headwater reservoir elevation sensor 50 and a tailwater reservoir elevation sensor 52. Both sensors 50 and 52 are preferably water level transducers of a type generally known in the art. Signals produced by sensors 50 and 52 are used to determine the gross differential head between reservoirs 12 and 18. In addition, signals from tailwater elevation sensor 52 may be used to determine a submersion factor a in a manner known in the art, providing a relative indication of the submersion level of pump-turbine 28 relative to (typically below) tailwater reservoir 18.

Pressure transducers 54, 56, 58 and 60 are preferably provided on either side of headwater and tailwater trash racks 22 and 24 as illustrated in FIG. 2. Output signals from these transducers, representative of pressure head on either side of the trash racks, are used to determine differential pressure or head loss across the racks. Such differential pressure provides a relative indication of the degree of fouling of the trash racks. Also indicated in FIG. 2 are pressure transducers 62 and 64, positioned adjacent to upstream and downstream ends of conduit 16. Similar transducers 66 and 68 are preferably positioned in downstream conduit 20. Transducer sets 62–64 and 66–68 provide signals representative of pressure at their respective locations and may be used to determine head losses through each conduit.

As shown in FIG. 3, instrumentation for controller 120 also preferably includes a motor-generator power monitor 70 coupled to electrical service conductors (not shown) between motor-generator 70 and power grid interface circuitry (not shown). Monitor 70 provides an indication of electrical power input to motor-generator 30 for driving pump-turbine 28 during the pumping mode of operation. High and low side pressure transducers 72 and 74 are positioned adjacent to pump-turbine 28 in upstream conduit 16 and downstream conduit 20, respectively. Output from transducers 72 and 74, representative of pressure at their respective locations, serves as a basis for determining total pump head across pump-turbine 28. Also as shown in FIG. 3, a differential pressure transducer set 76 is provided in conduit 20 for determining flow rate through pump-turbine 28. Such differential pressure signals provide an indirect indication of flow rate, which can be subsequently calculated by well known techniques, such as a Winter-Kennedy type method. Alternatively, direct flow measurement devices, such as acoustic or ultrasonic flow meters, could be provided within the flow path of pump-turbine 28 to provide the desired flow rate indication.

Referring to FIG. 4, a position feedback sensor 78 is preferably associated with actuator 38 or a portion of the linkages between actuator 38 and gates 36. Sensor 78, which may be any suitable type of position transducer, such as a potentiometer, linear variable differential transformer or the like, provides a signal indicative of the relative angular position of gates 36. Cavitation sensors 80 and 82 are preferably provided in the vicinity of the pump-turbine draft tube 81, headcover 83 and on the wicket gates 36. Sensors 80 and 82, which are preferably acoustic emission sensors, provide an indication of the relative level of cavitation in pump-turbine 28 by detecting water-borne noise produced by such cavitation.

In addition to the sensors outlined above, in the presently preferred embodiment, a number of additional sensors are provided for indicating the states of vibration, seal clearances and bearing loads at various locations in unit 26. In particular, accelerometers 84, 86, 88 and 90 are provided in the vicinities of the pump-turbine head cover 83, the gate actuating linkages, the thrust bearing 89 and the motor-generator upper bridge 91, respectively, as shown in FIG. 4. Accelerometers 84, 86, 88 and 90 provide an indication of structural vibration imparted on support structure 32 by operation of pump-turbine 28. In addition, proximity probes 92, 94, 96 and 98 are provided in the vicinities of turbine guide bearing 93, trust bearing 89, lower motor-generator guide bearing 97 and upper motor-generator guide bearing 99, respectively. Probes 92, 94, 96 and 98 provide signals proportional to loading on the respective bearings as an indication of lateral displacement and axial loading of shaft 34. Another indication of loading is provided by proximity probes 100 and 102 positioned in the vicinity of upper and lower sealing surfaces of impeller 29. Probes 100 and 102 provide signals indicative of displacement of impeller 29 within the housing of pump-turbine 28, and of seal clearance gaps between stationary and rotating wear rings on the impeller and the pump-turbine housing surrounding the impeller. Additional bearing loading information is preferably provided by strain gauge sets 104, 106, 108 and 110 secured to turbine guide bearing 93, thrust bearing 89, lower motor-generator guide bearing 97 and upper motor-generator guide bearing 99, respectively. Strain gauge sets 104, 106, 108 and 110 provide signals indicative of deformation resulting from bearing loading, in a manner well known in the art. Finally, bearing temperature sensors (not shown) are preferably provided on bearings 93, 89, 97 and 99 to provide signals representative of the temperature of the bearing sets, as a further indication of bearing loading.

As mentioned above, the preferred instrumentation is used in the present technique to detect and monitor levels of key operating parameters of pump-turbine 26. Certain of these parameters, such as head, flow rate and input power level are used to define a virtual cam matrix as described more fully below. However, as distinguished from conventional virtual 3D cams, the present technique permits the creation of a virtual cam having additional dimensions and providing additional classification of particular operating conditions. For example, presently preferred additional dimensions of the virtual cam include a relative submersion factor ($\sigma$), determined in accordance with well known techniques, upper and lower impeller seal clearance, neighboring unit operating state, trash rack head losses and conduit head losses. Each of these additional parameters may affect performance of the pump-turbine unit in unique ways. For example, where unit 26 shares a length of penstock with one or more additional units, the operating state of those units (e.g., operating or not operating) can significantly affect the dynamic flow characteristics of both units, and ultimately, the optimal gate settings for pumping mode operation. Thus, because data relating to optimal gate settings is ultimately determined for each matrix location as described below, such optimal settings are preferably determined taking into account all of the parameters or dimensions of the virtual cam matrix.

The above instrumentation also serves to provide parameter signals for the specific parameters optimized by the gate settings selected. Each of these parameters also affects performance of unit 26. For example, seal clearance is a parameter which can have significant impact on performance. The shape of the head-flow characteristic and efficiency-flow characteristic of the pump-turbine in the pumping mode at a constant wicket gate opening position can change as a result of the seal clearance, adversely affecting efficiency, and particularly head and vibration at higher heads of operation. Similarly, leakages due to seal clearances may influence stability of the pump-turbine. Mechanical vibration tends to reduce the useful life of mechanical components and linkages, such as bushings, leading to costly down time for maintenance and component replacement. Excessive guide bearing temperatures may be caused by side loading and may be indicative of overloading that will eventually lead to the need to replace the bearings. In the same way, excessive cavitation levels may be considered indicative of operation at levels that will eventually lead to the need for cavitation blade repair. All of these factors may potentially reduce efficiency of the unit or accelerate costly maintenance or even component failure. Moreover, because these factors may be influenced by wicket gate position during pumping, the present optimization technique preferably considers such adverse affects in combination in selecting desired gate positions. In particular, in the embodiment described below, optimized parameters include pumping efficiency, vibration and cavitation. However, other parameters on which optimization may be based include sealing clearances, bearing loading and bearing temperature.

Figure 5:
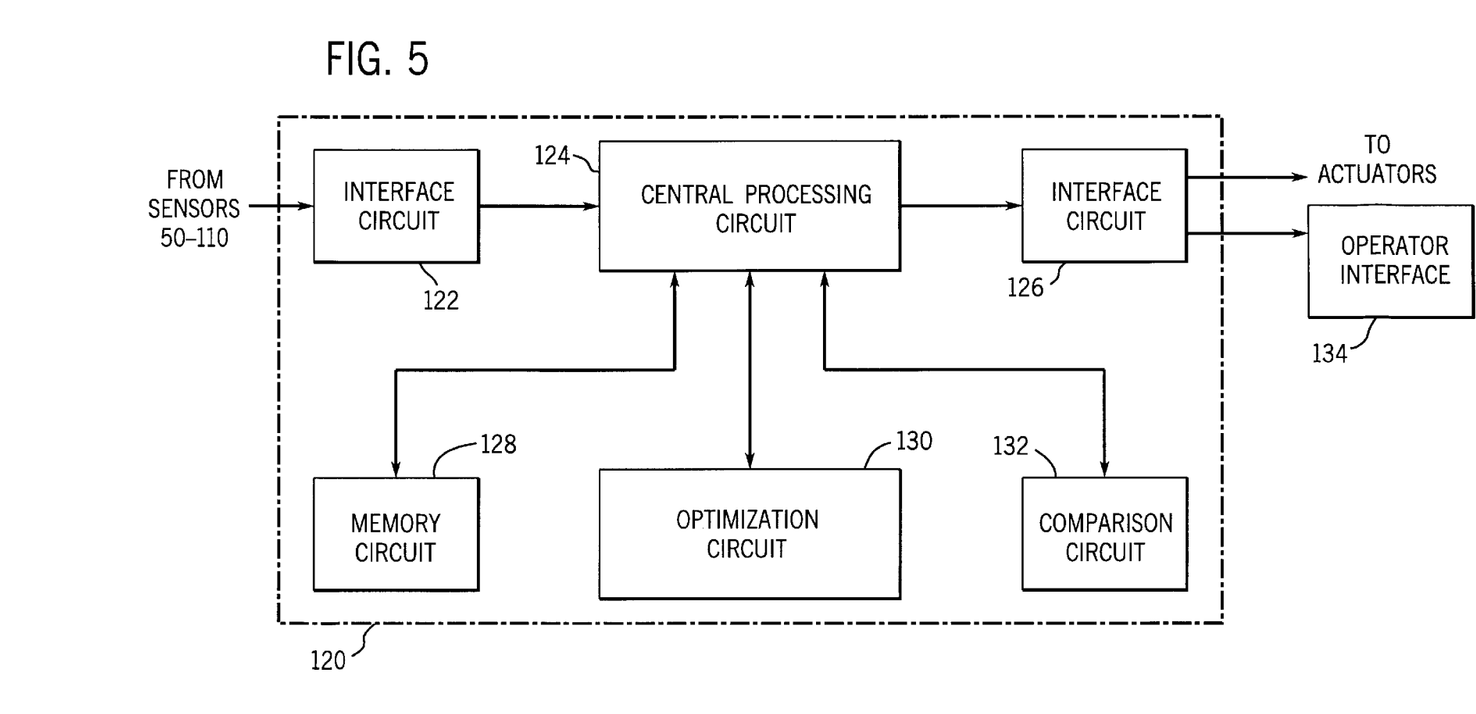
FIG. 5 is a block diagram of certain of the functional circuits in an exemplary control system for monitoring various operating parameters during a pumping mode of operation of the pump-turbine unit.

All of the sensing devices outlined above are coupled to controller 120 through appropriate data links and apply their respective signals to controller 120 as illustrated diagrammatically in FIG. 5. As shown in FIG. 5, controller 120 includes several functional circuits, including an input interface circuit 122, a central processing circuit 124, an output interface circuit 126, a memory circuit 128, an optimization circuit 130 and a comparison circuit 132. Interface circuit 122, which typically includes appropriate multiplexing, analog-to-digital converting and signal conditioning circuitry receives operating parameter signals from sensors 50–110, and applies these signals to central processing circuit 124. Similarly, interface circuit 126, which typically includes signal conditioning and valve driver circuits for operating gate actuators 38, receives control signals from central processing circuit 124 and commands corresponding servo movement of gates 36. Interface circuit 126 also includes appropriate drivers and signal conditioning circuitry for an operator interface 134, preferably including a monitor and keyboard at an operations control station (not shown).

Central processing circuit 124 is also linked to memory circuit 128, optimization circuit 130 and comparison circuit 132. In operation, central processing circuit 124 executes a cyclical control routine stored within memory circuit 128 for controlling operation of unit 26. For the present purposes, details of the main control routine unrelated to optimization of pumping mode performance are not discussed herein for the sake of clarity. As described more fully below, during certain phases of the control routine, central processing circuit 124 calls upon comparison circuit 132 to perform comparisons of the sensed operating parameters with a set of reference values for the same parameters stored in memory circuit 128. These comparisons enable central processing circuit 124 to locate the set of current operating parameters in a multi-dimensional matrix (i.e. an N-dimensional virtual cam) defined by the reference values for the pumping mode of operation of unit 26. When the comparison indicates that an optimal gate setting for the set of operating parameters needs to be identified, central processing circuit 124 calls upon optimization circuit 130 to perform a search for the desired gate position as summarized below. Following the search, the optimal gate position is stored in memory circuit 128 for future use when the same set of operating parameter values is encountered. Alternatively, data representative of the influence of gate positions on optimized parameters may be stored in memory circuit 128 and used as a basis for deriving the optimal gate position for the current location in the virtual cam matrix.

As will be appreciated by those skilled in the art, the functional circuitry represented in FIG. 5 may be defined by standard input/output circuitry, memory circuitry and programming code in a standard programmable logic controller, personal computer, computer workstation or the like. For example, in the presently preferred embodiment, central processing circuit 124, in the form of a programmable logic controller dedicated to facility 10, is provided with resident memory for executing the main control routine. Optimization circuit 130 and comparison circuit 132 are configured in a portable computer system that can be selectively linked to the programmable logic controller to execute optimization of gate settings when desired. Alternatively, optimization and comparison circuitry may be configured in a single controller with central processing circuit 124, or may be entirely remote from facility 10 and selectively linked to central processing circuit 124 by modem or other telecommunication device.

Figure 6A:
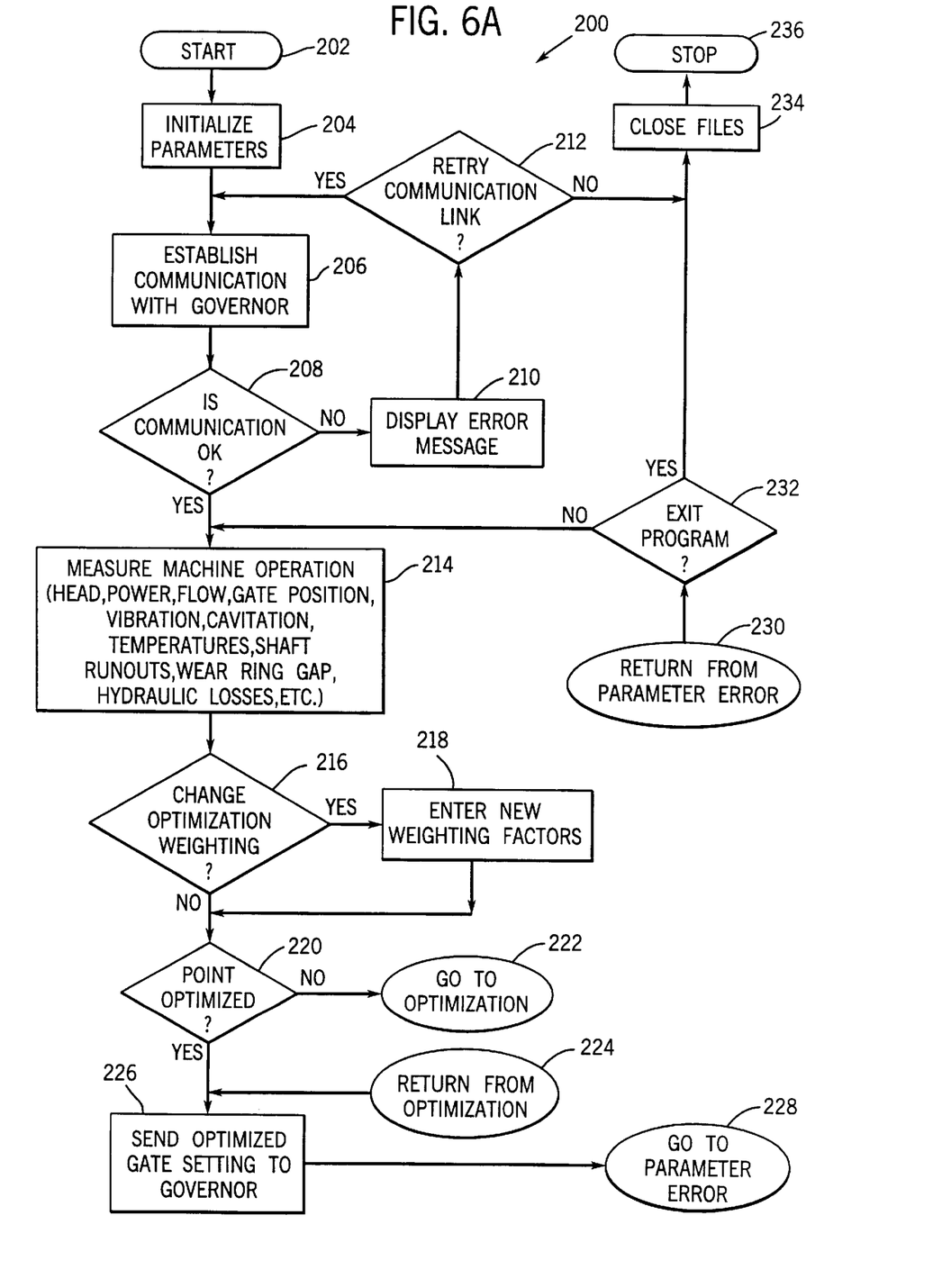
FIGS. 6A–6C are flow charts illustrating steps of exemplary control logic for determining optimal wicket gate settings for the pumping mode of operation of the pump-turbine installation.
Figure 6B:
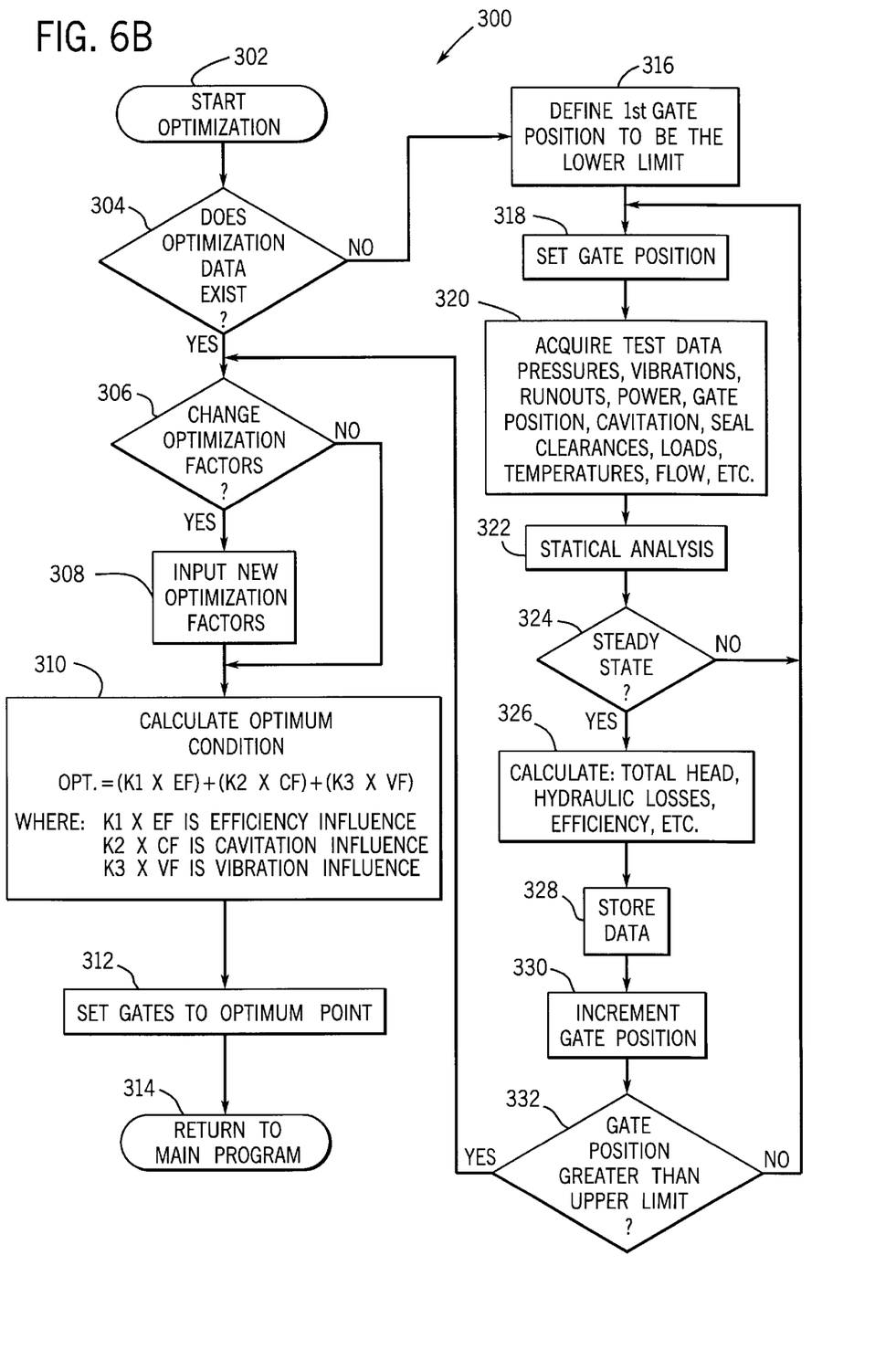
Figure 6C:
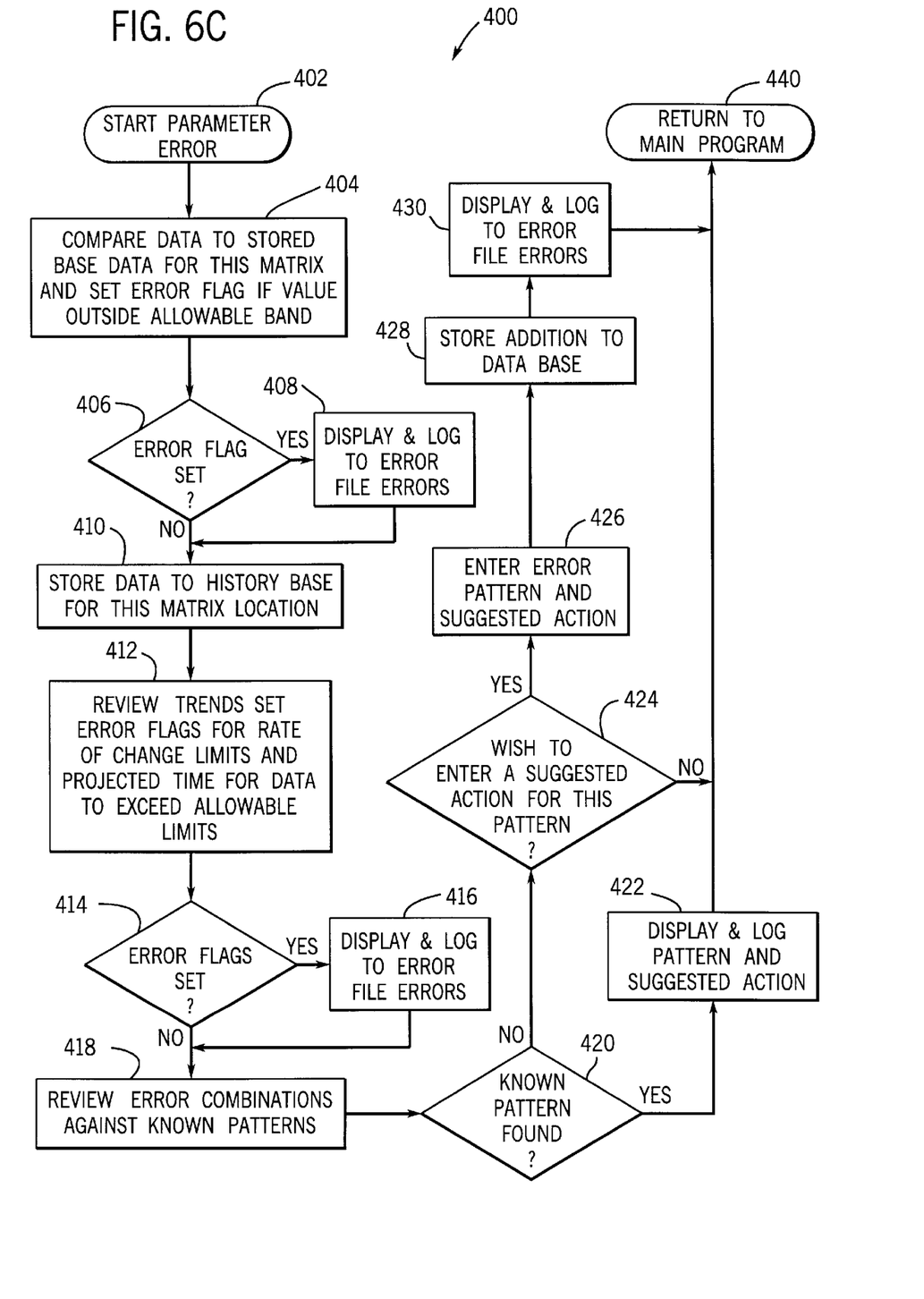

FIGS. 6A, 6B and 6C illustrate steps in exemplary control logic executed by controller 120 for determining desired or optimal positional settings for gates 36 in the pumping mode of operation of pump-turbine 28. In the preferred embodiment, the present technique divides key operating parameters, including head across pump-turbine 28, flow rate through pump-turbine 28 and power input to drive pump-turbine 28 into operational range segments, such as 10 segments over the allowable or expected operating range for each parameter. The resulting range segments thus form a matrix of operational parameter levels stored in memory circuit 128 (i.e., the "N-dimensional virtual cam matrix" referred to above). During normal pumping mode operation of unit 26, central processing circuit 124 identifies desired or current operating conditions and calls on comparison circuit 132 to compare the current operating parameters with the range segments for the same parameters stored in memory circuit 128. When a particular combination of parameter range segments is encountered for which an optimal gate setting has yet to be established, optimization circuit 130 identifies a desired gate positional setting through an optimization search as described below. The optimization may be based on one or more parameters of interest, such as pumping efficiency. However, the search preferably identifies the influence of various gate positions on the operating parameters of interest and these influences are combined, through weighting factors, into an optimization index value. This index value then provides an indication of the optimal gate positional setting for the combination of weighted parameter influences and for the virtual cam matrix location being populated.

FIG. 6A illustrates a portion of a main control routine 200 executed by controller 120. Routine 200 begins at step 202, and at step 204 all monitored operating parameter values are initialized. At step 206, controller 120 establishes communication with an electronic governor module, which may be remote to controller 124. This electronic governor module provides operational control of various settings for pumpturbine 28 under normal operation in a manner well known in the art. At step 208, controller 120 evaluates the communication link with the electronic governor, and if the communication link is determined to be faulty, displays an error message on operator interface 134, as indicated at step 210. At step 212, controller 120 prompts an operator to select whether the communication link should be retried. If so, controller 120 returns to step 206, otherwise, routine 200 is exited by closing all files at step 234 and stopping the application at step 236.

Once communication is established with the unit's electronic governor, signals from all sensors monitoring parameter values are polled at step 214 to measure the parameter values. As will be appreciated by those skilled in the art, certain of the "measured" parameters referred to in step 214 are, in practice, derived from sensed parameter signals. For example, when flow rate is measured indirectly, central processing circuit 124 will typically include appropriate program code for deriving flow rate values from measured pressure data. At step 216, controller 120 prompts the operator through interface 134 to select whether optimization weighting coefficients should be altered from their current settings. These weighting coefficients generally establish the relative influence of the various optimized parameters in selecting preferred gate positional settings as discussed in greater detail below. If the operator selects to change the weighting coefficients, the new coefficients are entered at step 218. Following step 218, or if the coefficients are not changed, controller 120 advances to step 220.

At step 220, comparison circuit 132 compares the current levels of operating parameters in the virtual cam matrix with reference levels defining the range segments in the matrix to determine the location of the current operating conditions in the virtual cam matrix. In the presently preferred embodiment, the virtual cam matrix accessed at step 220 is based on flow rate, head and power input levels, although this matrix can be expanded to include additional operating parameters as discussed above. By accessing a memory location assigned to the particular combination of parameter ranges, central processing circuit 124 then determines whether an optimal gate setting has been determined for the matrix location. If not, controller 120 proceeds to step 222, where an optimization routine 300 is executed as summarized below with reference to FIG. 6B. Once optimization routine 300 is completed, controller 120 returns to main routine 200 at step 224, and at step 226 transmits the optimal gate position to the electronic governor for positioning gates 36.

From step 226, controller 120 proceeds to step 228, where a parameter error routine 400 is executed as summarized below with reference to FIG. 6C. In general, parameter error routine 400 verifies that sensed or calculated parameter values are consistent with expected ranges of variation, and determines whether adjustments to the virtual cam matrix or the optimization routine are in order (e.g., expanding the matrix to additional range segments or modifying the weighting coefficients for the optimization routine). From parameter error routine 400, controller 120 returns to main routine 200 at step 230. At step 232, controller 120 verifies whether an exit command has been received, such as from an automatic or operator commanded interrupt. If such a command has been received, the routine is exited at steps 234 and 236 as described above. Otherwise, controller 120 returns to step 214 to continue cycling through the main control routine.

Preferred flow of the present optimization technique is summarized in FIG. 6B. Optimization routine 300 is entered at step 302 from step 222 of the main control routine. At step 304, controller 120 accesses memory circuit 128 to determine whether characteristic data relating optimized parameters to wicket gate position has been identified for the current set of operating conditions (i.e., the location in the virtual cam matrix). If not, controller 120 proceeds to step 316 to generate such data as described below. If such information is found in memory circuit 128, controller 120 proceeds to step 306, where controller 120 prompts the operator to select whether optimization factors are to be changed.

In the presently preferred embodiment, a number of factors are preferably considered for selection of the desired gate position for the virtual cam matrix location being populated with a desired gate positional setting. As illustrated in FIG. 6B, these factors preferably include pumping efficiency, cavitation and vibration. Because the pumping efficiency ultimately results in real or opportunity costs for the installation, it is generally desirable to operate at the peak efficiency for the current operating conditions reflected in the cam matrix location. However, other factors, such as cavitation and vibration also ultimately result in costs to the installation, typically in terms of higher or more frequent maintenance and lost revenue during maintenance down times. Moreover, the optimal gate setting for minimizing costs resulting from such operating parameters may not, and typically is not the same setting as that resulting in peak efficiency. Thus, the present technique provides a mechanism for balancing the influences of the gate positional setting on these various parameters.

Thus, at step 308, the operator may change the parameters on which the desired gate position is selected. Additional optimization factors might include, for example, bearing temperature. At step 310, controller 120 determines the optimal gate setting for the current virtual cam matrix location by minimizing an optimization index value derived from the relationship:

$$Opt = (K1 \times EF) + (K2 \times CF) + (K3 + VF) \qquad (1);$$

where Opt is the optimization index value, K1, K2, and K3 are weighting or penalty coefficients, and EF, CF and VF are a factors representative of the influence of gate position on pumping efficiency, cavitation and vibration, respectively, as described below.

It should be noted that although equation (1) is presently preferred, the present technique permits an unlimited number of parameter values to be considered in determining the optimal gate setting. In general, the technique is intended to minimize deviation from optimal gate settings for each of the optimized parameters in accordance with the relationship:

$$Opt = [K1 \times (P1(o) - P1(s))] + [K2 \times (P2(o) - P2(s))] + \ldots + [Kn \times (Pn(o) - Pn(s))] \qquad (2);$$

where P1(o), P2(o) and Pn(o) are optimum levels of first, second and nth optimized parameters at any gate setting for the current virtual cam matrix location, and P1(s), P2(s) and Pn(s) are actual levels for the same parameters at the selected or desired gate setting. By determining the influence of gate settings on each of the optimized parameters, as described below, controller 120 may thus determine which gate setting results in the optimal level for index value Opt. The values of optimal levels of the parameters and functions relating each parameter to gate position (to determine the actual parameter levels at the selected gate position) are identified through a gate positioning test sequence described below.

It should also be noted that the optimized parameters considered at step 310 may include parameters defining the virtual cam matrix in memory circuit 128, or may be entirely different parameters. In general, as mentioned above, the virtual cam matrix will include the parameters of head, flow and power input. However, as discussed above, additional parameters, or "dimensions" may include, by way of example, seal clearance, the operating state of neighboring units in a multi-unit facility, the relative situation of the particular unit in the facility (e.g., adjacent to a stream or pond bank or near the middle of a stream) and the relative condition of upstream or downstream conduits (e.g., as indicated by sensed head losses through the conduits). While such parameters may be considered for the purposes of gate setting optimization, they are typically better suited to definition of the N-dimensional virtual cam matrix. On the other hand, parameters considered for optimization are preferably those that are more directly influenced by gate positional changes.

Once the desired gate setting has been determined, controller 120 sets the gates to the optimal point at step 312 and saves the setting in memory circuit 128 for the virtual cam matrix location. Controller 120 then returns to main routine 200 as indicated at step 314.

Figure 7:
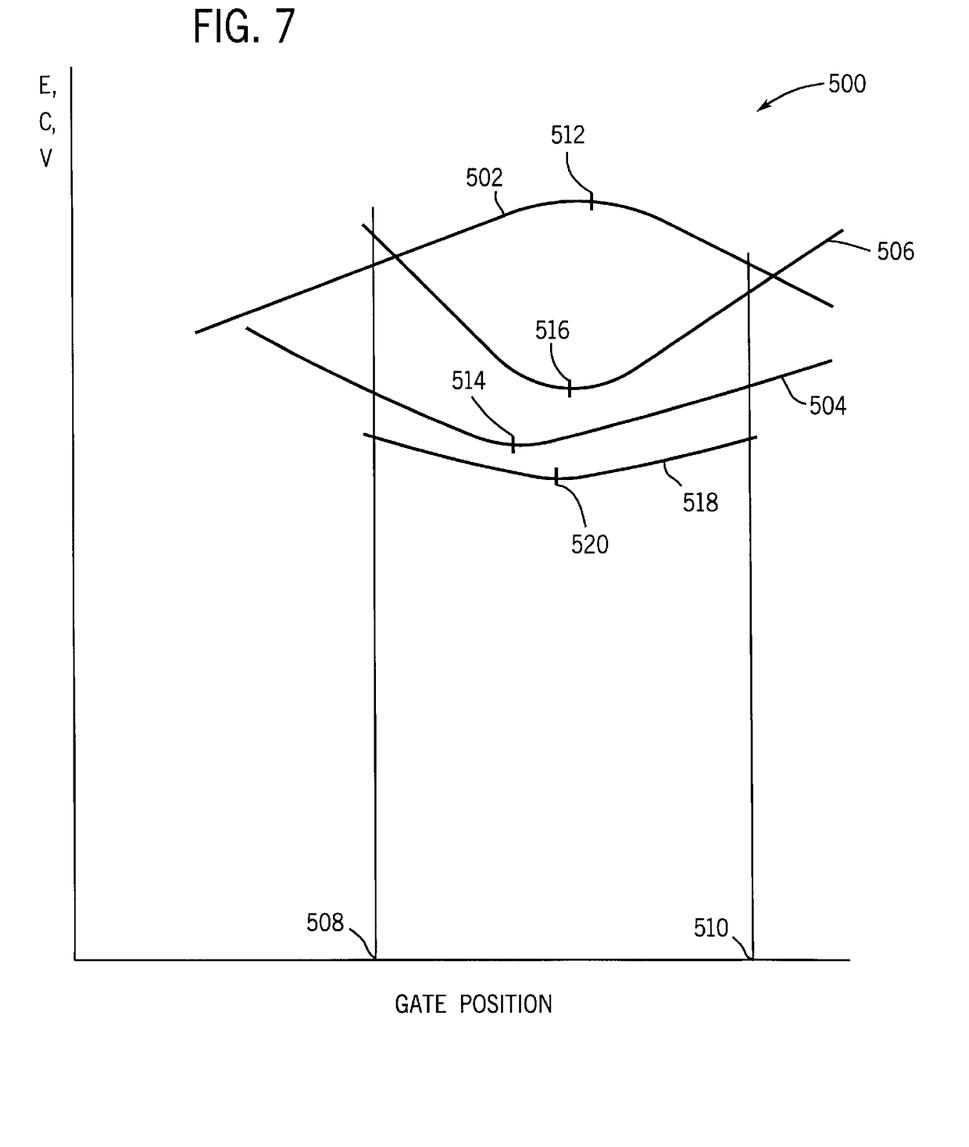
FIG. 7 is a graphical illustration of exemplary curves relating several operating parameters to gate position as a basis for determining a preferred gate positional setting in accordance with one aspect of the present technique.

With reference to FIGS. 6B and 7, the influence of gate position on the optimized parameters is determined as follows. FIG. 7 represents a family of exemplary curves 500 relating optimized parameters of pumping efficiency, cavitation, and vibration to gate position. At step 304, if controller 120 does not locate such data in memory circuit 128 from previous execution of optimization routine 300, it proceeds to step 316. At step 316, a first gate test position is assigned to be a lower limit position for the gates. This lower limit position may be represented by the vertical line extending from point 508 in FIG. 7. At step 318, the gates are set to this initial position. At step 320, the sensors providing indications of the optimized parameters are polled. This procedure is preferably performed several times at step 320, and the resulting values are statistically analyzed at step 322, such as by determining mean and standard deviation values for the parameter levels. At step 324, controller 120 determines whether the pump-turbine unit has stabilized by comparing the statistical data to acceptable variances allowable for steady state operation. If steady state operation has not been reached, controller 120 returns to step 318 to await steady state conditions.

Once steady state conditions are reached, controller 120 proceeds to step 326, where elements of the optimized parameters are calculated, along with the parameters themselves. For example, in the presently preferred embodiment, the pumping efficiency value is determined from the total head across pump-turbine 28, flow rate through the unit and the power input to drive the pump-turbine, in a manner well known in the art. To allow comparison to model test data, this total head is calculated based upon the signals produced by sensors 72 and 74 plus a velocity head correction where an absolute flow rate measurement is used (e.g., from an acoustic or ultrasonic sensor). Where a relative or indirect flow rate measurement is used (such by a Winter-Kennedy type calculation), the total head may be provided by a differential pressure transducer at the location of sensors 74 and 76. At step 328, this data is stored in memory circuit 128.

At step 330, the gate position is incremented (such as by 10% of the total allowable gate movement range). At step 332, controller 120 verifies whether the new gate test position exceeds the upper limit gate position, as indicated by the vertical line extending from point 510 in FIG. 7. If the upper limit is not exceeded, controller 120 returns to step 318 where the gate is moved to the new test setting. The procedure outlined above is then repeated until the gate upper limit position is exceeded at step 332.

The data measured through steps 316–332 identifies the influence of gate position on the optimized parameters as illustrated in FIG. 7. Curves such as those shown in FIG. 7 represent data preferably obtained by a curve fitting technique, such as linear curve fitting, based on the data obtained in steps 316–332. For example, curve 502 represents the influence of gate position on pumping efficiency, which reaches a peak at a point 512. Similarly, curves 504 and 506 represent the influence of gate position on cavitation and vibration, respectively, which reach respective minima at points 514 and 516. Through subsequent incorporation of this data in the optimization determination at step 310, values of optimization index Opt may be obtained as a function of gate position, inherently taking into account both the separate optima of each optimized parameter, the shape of the parameter curve surrounding the optimal point, and the weighting coefficients for each parameter, as indicated by curve 518. As will be appreciated by those skilled in the art, depending upon the relative weighting of each parameter, the overall optimal setting, indicated by the minimum point 520 on Opt versus gate settings curve 518 may typically not correspond to any one of the individual optima for the separate operating parameters, but instead represents a balance between the gate position influence on each of the optimized parameters.

As indicated at step 228 of FIG. 6A, the present technique also provides a mechanism for determining whether sensed data is historically consistent and whether the optimization routine should be modified. As shown in FIG. 6C, parameter error routine 400 begins at step 402, and at step 404, controller 120 determines whether data sensed or calculated at step 214 above falls within the virtual cam matrix stored in memory circuit 128. If not, an error flag is generated. At step 406, circuit 124 determines whether such a flag is set. If so, circuit 124 causes an error message to be displayed on operator interface 134, and logs or stores the errors in memory circuit 128, as indicated at step 408.

Following step 408, or if no error flag is detected at step 406, at step 410 the sensed or calculated data is stored to a history data base for the matrix location. At step 412, based upon the historical data stored in the data base, circuit 124 evaluates trends in the data to determine whether a rate of change limit has been exceeded. If so, an error flag is set. Such rate of change limits are preferably set during configuration of routine 400 and are stored in memory circuit 128. Exceeding a rate of change limit is then considered to indicate that degradation in a sensed parameter is occurring as an abnormal rate. Also at step 412, circuit 124 projects or estimates the time expected for the changing parameter to exceed an allowable limit if proceeding at its current rate. At step 414, circuit 124 determines whether any error flags were set in step 414, and, if so, displays an error message on operator interface 134 and saves the errors in memory circuit 128.

At step 418, controller 120 reviews any combinations of errors logged at steps 408 and 416 to identify any known error patterns, indicative of some known system degradation or failure. At step 420, if any pattern was recognized, circuit 124 proceeds to step 422, where a pattern alert message is displayed on operator interface 134, and the trend is stored in memory circuit 128. From step 422, circuit 124 returns to the main routine as indicated at step 440. If no known pattern was recognized, circuit 124 proceeds from step 420 to step 424, where an operator may identify or label any unknown patterns in the logged parameter errors and suggest corrective action in response to the error pattern. If the operator elects not to do so, circuit 124 returns to the main control routine. If a pattern identity and corrective action are suggested by the operator, this information is entered at step 426, and at step 428, the new identity and corrective action data are stored in memory circuit 128. The newly entered information is then displayed and logged at step 430, from which point, controller 120 again returns to the main control routine.

As will be appreciated by those skilled in the art, parameter error routine 400 provides a diagnostic tool for identifying abrupt changes in sensed or calculated parameters on the basis of which the matrix and optimization techniques outlined above are executed. For example, where data outside the range of the matrix is identified, this may indicate failure or malfunction of one or more sensors, or may be symptomatic of longer term changes in the parameters. In the latter case, plant operations or engineering personnel may opt to expand or otherwise modify the matrix to accommodate the changes and determine new optimum gate settings accordingly. For example, parameters such as seal clearance defining the virtual cam matrix may gradually change to levels not originally included in the matrix, requiring modification of the matrix and population of the new matrix locations with optimal gate settings. Moreover, by identifying trends in optimized parameters, operations personnel may identify potential problem areas, such as bearings or seals, for which optimization coefficients may need to be increased to forestall maintenance costs or operational down time, or shut down the unit for emergency maintenance.

While the foregoing description has been provided for the presently preferred embodiment of the invention, the invention is not intended to be limited to any particular arrangement, but is defined by the appended claims. Various alternative configurations of the invention may occur to those skilled in the art, and to the extent such variations fall within the scope of the claims, they are intended to form a part of the claimed invention. For example, in the preferred embodiment characteristic data is identified relating optimized parameters to gate position and the optimal gate position is subsequently determined by reference to an optimization index based on the data. Alternatively, however, a similar optimization index value may be generated for each gate position tested and an iterative process used to select the gate position resulting in the minimum or optimal value of the index.

Similarly, in the above discussion, reference was made to storing values representative of the desired gate setting for each virtual cam matrix location for later use. Alternatively, data identified in the gate position test sequence indicating the influence of gate settings on the optimized parameters may be stored instead of the actual gate position. Subsequently, at step 304, controller 120 will access this influence data from the memory circuit and determine the optimal gate setting at step 310 in real time, each time the virtual cam matrix location is encountered. The latter approach has the advantage of allowing new optimal gate settings to be determined in response to changes in weighting coefficients without re-evaluating the influence of gate settings on the optimized parameters. As a further alternative, both currently preferred gate settings and influence data may be stored for each matrix location, and the gate settings updated following changes in the weighting coefficients.

What is claimed is:

1. A method for optimizing performance of a pump-turbine power generating unit, the unit including a pump-turbine in fluid communication between a headwater reservoir and a tailwater reservoir, a motor-generator coupled to the pump-turbine for generating electrical power as water flows through the pump-turbine from the headwater reservoir to the tailwater reservoir during a turbining mode of operation and for driving the pump-turbine to displace water from the tailwater reservoir to the headwater reservoir during a pumping mode of operation, and a plurality of movable gates for regulating flow through the pump-turbine, the method comprising the steps of:
    (a) determining influences of gate positions on at least one operating parameter of interest;
    (b) monitoring levels of a plurality of operating parameters during the pumping mode of operation of the pump-turbine;
    (c) based on the influences determined in step (a) and on the monitored levels, selecting a desired gate position to optimize the at least one parameter of interest; and
    (d) positioning the gates in the desired gate position.

2. The method of claim 1, wherein the influences determined in step (a) are determined by moving the gates to a plurality of positions during the pumping mode of operation, and monitoring levels of the at least one parameter of interest for each of the plurality of gate positions.

3. The method of claim 1, wherein influences of gate positions on a plurality of operating parameters of interest are determined in step (a), and the desired gate position is selected in step (c) to optimize a weighted combination of the plurality of parameters of interest.

4. The method of claim 1, wherein the at least one parameter of interest is pumping efficiency of the pump-turbine unit.

5. The method of claim 3, wherein the influences determined in step (a) are determined by moving the gates to a plurality of positions during the pumping mode of operation, and monitoring levels of the plurality of parameters of interest when the gates are in each of the plurality of positions, the plurality of parameters of interest including at least head across the pump-turbine, flow through the pump-turbine and power input to the motor, and deriving pumping efficiency values for each of the plurality of positions.

6. The method of claim 1, wherein data representative of the influences determined in step (a) is stored in a memory circuit for subsequent use in determining the desired gate position.

7. The method of claim 1, wherein a desired gate position value is stored in a memory circuit for subsequent positioning of the gates when subsequently monitored operating parameters of the unit correspond to the operating parameters on which the desired gate position value is based.

8. The method of claim 1, wherein steps (a) and (b) are repeated for different levels of the monitored operating parameters to determine influences of gate positions on the at least one operating parameter of interest at the different levels of the monitored operating parameters, and influence data determined for the different levels is stored in a memory circuit to form a virtual cam in which the operating parameter levels are assigned desired position values.

9. The method of claim 1, wherein the steps are repeated for different levels of the monitored operating parameters to determine different desired position values associated with the different levels, and the desired position values are stored in a memory circuit to form a virtual cam in which the operating parameter levels are assigned desired position values.

10. A method for improving performance of a pump-turbine power generating unit, the unit including a pump-turbine in fluid communication between a headwater reservoir and a tailwater reservoir, a motor-generator coupled to the pump-turbine for generating electrical power as water flows through the pump-turbine from the headwater reservoir to the tailwater reservoir during a turbining mode of operation and for driving the pump-turbine to displace water from the tailwater reservoir to the headwater reservoir during a pumping mode of operation, and a plurality of movable gates for regulating flow through the pump-turbine, the method comprising the steps of:

(a) positioning the gates in a plurality of positions during the pumping mode of operation;

(b) monitoring levels of operating parameters of the unit when the gates are in each of the positions;

(c) deriving parameter reference levels from the operating parameters;

(d) comparing the parameter reference levels and determining, based upon the comparison, a desired gate position; and (e) storing in a memory circuit a desired position value representative of the desired gate position.

11. The method of claim 10, wherein the operating parameters include head across the pump-turbine, flow through the pump-turbine and power input to drive the motor-generator.

12. The method of claim 11, wherein in step (c) a reference pumping efficiency level is derived for each gate position, and in step (d) the desired gate position is selected that results in the highest pumping efficiency level.

13. The method of claim 11, wherein the operating parameters further include at least one operating parameter selected from the group comprising cavitation and vibration.

14. The method of claim 13, wherein the desired gate position is selected at least in part based upon minimization of cavitation.

15. The method of claim 13, wherein the desired gate position is selected at least in part based upon minimization of vibration.

16. A method for improving performance of a pump-turbine power generating unit, the unit including a pump-turbine in fluid communication between a headwater reservoir and a tailwater reservoir, a motor-generator coupled to the pump-turbine for generating electrical power as water flows through the pump-turbine from the headwater reservoir to the tailwater reservoir during a turbining mode of operation and for driving the pump-turbine to displace water from the tailwater reservoir to the headwater reservoir during a pumping mode of operation, and a plurality of movable gates for regulating flow through the pump-turbine, the method comprising the steps of:

(a) determining influences of gate positions on a plurality of parameters of interest;

(b) monitoring levels of the parameters of interest during the pumping mode of operation of the pump-turbine;

(c) based on the influences determined in step (a) and on the monitored levels of the parameters of interest, generating an index value;

(d) selecting a desired gate position to optimize the index value; and (e) positioning the gates in the desired position.

17. The method of claim 16, wherein the influences determined in step (a) are determined by moving the gates to a plurality of positions during the pumping mode of operation; and monitoring levels of the parameters of interest for each of the plurality of gate positions.

18. The method of claim 16, wherein the index value is derived from the monitored levels by determining parameter reference values for each parameter of interest at the desired gate position and multiplying each parameter reference value by a respective weighting coefficient.

19. The method of claim 16, wherein at least one of the parameters of interest is selected from a group consisting of pumping efficiency, cavitation and vibration.

20. A method for improving performance of a pump-turbine power generating unit, the unit including a pump-turbine in fluid communication between a headwater reservoir and a tailwater reservoir, a motor-generator coupled to the pump-turbine for generating electrical power as water flows through the pump-turbine from the headwater reservoir to the tailwater reservoir during a turbining mode of operation and for driving the pump-turbine to displace water from the tailwater reservoir to the headwater reservoir during a pumping mode of operation, and a plurality of movable gates for regulating flow through the pump-turbine, the method comprising the steps of:

(a) dividing operating ranges of each of a plurality of operating parameters for the pump-turbine into a plurality of operating range segments to define a virtual cam matrix comprising matrix locations bounded by the operating range segments, the operating parameters including head, flow rate, power input level during the pumping of operation of the pump-turbine and at least one other operating parameter;

(b) storing the virtual cam matrix in a memory circuit;

(c) identifying optimal gate setting data for at least one of the matrix locations; and (d) storing the optimal gate setting data in the memory circuit for reference in positioning the gates when subsequent operating parameters levels are detected corresponding to the associated matrix location.

21. The method of claim 20, wherein the optimal gate setting data is representative of a desired gate setting for the matrix location.

22. The method of claim 20, wherein the optimal gate setting data includes data representative of influences of gate positions on at least one parameter of interest.

23. A method for improving performance of a pump-turbine power generating unit, the unit including a pump-turbine in fluid communication between a headwater reservoir and a tailwater reservoir, a motor-generator coupled to the pump-turbine for generating electrical power as water flows through the pump-turbine from the headwater reservoir to the tailwater reservoir during a turbining mode of operation and for driving the pump-turbine to displace water from the tailwater reservoir to the headwater reservoir during a pumping mode of operation, and a plurality of movable gates for regulating flow through the pump-turbine, the method comprising the steps of:

(a) monitoring a level of at least a first operating parameter of interest of the pump-turbine during the pumping mode of operation;

(b) storing a parameter value representative of the monitored level in a memory circuit;

(c) repeating steps (a) and (b) over a predetermined time interval to generate a collection of parameter values representative of the monitored level over the time interval;

(d) comparing the parameter values to identify a change in the monitored level;

(e) comparing the change in the monitored level with a reference level; and (f) generating a signal indicative of a deviation from a predetermined relationship between the change and the reference level.

24. The method of claim 23, wherein optimal gate settings for the pump-turbine operating in the pumping mode are based at least in part on the level of the first operating parameter.

25. The method of claim 24, wherein the optimal gate settings are also based on at least a second operating parameter considered in weighted combination with the first operating parameter.

26. The method of claim 25, wherein the weighting between the first and second operating parameters is altered in response to the predetermined relationship between the first operating parameter and the reference level.

27. A system for improving performance of a pump-turbine power generating unit, the unit including a pump-turbine in fluid communication between a headwater reservoir and a tailwater reservoir, a motor-generator coupled to the pump-turbine for generating electrical power as water flows through the pump-turbine from the headwater reservoir to the tailwater reservoir during a turbining mode of operation and for driving the pump-turbine to displace water from the tailwater reservoir to the headwater reservoir during a pumping mode of operation, and a plurality of gates movable by at least one actuator for regulating flow through the pump-turbine, the system comprising:

at least one sensor for detecting an operating parameter of interest of the pump-turbine unit during the pumping mode of operation, and for generating parameter signals representative thereof;

a memory circuit; and a control circuit coupled to the at least one sensor, to the memory circuit and to the at least one actuator, the control circuit being configured to identify influences of gate positions on the parameter of interest, to monitor the parameter signals, to determine, based on the parameter signals and the influences, a desired gate position, and to command movement of the at least one actuator for placing the gates in the desired gate position.

28. The system of claim 27, wherein the at least one sensor is a plurality of sensors including:

a first sensor set for detecting differential head across the pumpturbine and generating head signals representative thereof;

a second sensor set for detecting flow rate of water through the pump-turbine and generating a flow rate signal representative thereof; and a third sensor set for detecting input power to the motor-generator during the pumping mode of operation and generating a power signal representative thereof.

29. The system of claim 27, wherein the at least one sensor is an acoustic emission sensor for detecting cavitation in the pump-turbine unit.

30. The system of claim 27, wherein the at least one sensor is a vibration sensor for detecting vibration of the gates.

31. The system of claim 27, wherein the at least one sensor is a vibration sensor for detecting vibration in bearing assemblies supporting the pump-turbine.

* * * * *